United States Patent
Hodgkinson

[19]

[11] Patent Number: 5,983,924
[45] Date of Patent: Nov. 16, 1999

[54] WATER DIVERTING DEVICE

[75] Inventor: Anthony Stephen Hodgkinson, Blackburn North, Australia

[73] Assignee: H.P.H. Pty. Ltd., Victoria, Australia

[21] Appl. No.: 08/860,432

[22] PCT Filed: Dec. 22, 1995

[86] PCT No.: PCT/AU95/00873

§ 371 Date: Jun. 20, 1997

§ 102(e) Date: Jun. 20, 1997

[87] PCT Pub. No.: WO96/19619

PCT Pub. Date: Jun. 27, 1996

[30] Foreign Application Priority Data

Dec. 22, 1994 [AU] Australia .............................. PN 0236

[51] Int. Cl.⁶ ....................................................... F16L 5/00
[52] U.S. Cl. ............................................ 137/360; 137/312
[58] Field of Search ................................. 137/312, 360, 137/313, 315, 357

[56] References Cited

U.S. PATENT DOCUMENTS

| 4,063,759 | 12/1977 | Steimle . | |
| 5,497,584 | 3/1996 | Bergmann | 137/360 |
| 5,603,347 | 2/1997 | Eaton | 137/360 |

FOREIGN PATENT DOCUMENTS

| 230681 | 10/1959 | Australia . |
| 54226/79 | 7/1980 | Australia . |
| 47984/85 | 5/1986 | Australia . |
| 66676/86 | 7/1987 | Australia . |
| 122359 | 11/1994 | Australia . |
| 74453/94 | 12/1994 | Australia . |
| 0040791 | 12/1981 | European Pat. Off. . |
| 0275113 | 7/1988 | European Pat. Off. . |
| WO 84/03925 | 10/1984 | WIPO . |
| WO 88/05515 | 7/1988 | WIPO . |
| WO 91/12456 | 8/1991 | WIPO . |
| WO 91/14837 | 10/1991 | WIPO . |
| WO 92/08013 | 5/1992 | WIPO . |
| WO 92/08071 | 5/1992 | WIPO . |
| WO 92/16698 | 10/1992 | WIPO . |
| WO 93/01367 | 1/1993 | WIPO . |
| WO 95/27165 | 10/1995 | WIPO . |

OTHER PUBLICATIONS

Australian Register of Designs, Registration No. 121254–No Date.
Patent Abstracts 2–304327, publication date Dec. 18, 1990.

*Primary Examiner*—David J. Walczak
*Attorney, Agent, or Firm*—Fish & Richardson, PC

[57] ABSTRACT

A water diverting device (10,51,60,70,80,83,85,86,600,700) for directing leaking water from a plumbing fitting such as a tap having a body (50) and breech (100) mounted behind the wall to the front face (401) of the wall, the device including a sleeve (12,56,58), an inner flange (18), an outer flange (20), the arrangement being such that the inner flange (18) engages the breech (100) of the tap and the tap body extends through the sleeve and the outer flange (20) engages the front face (401) of a wall whereby water leaking from the connection between the tap body and a tap breech is directed by the device to the front face of the wall.

52 Claims, 8 Drawing Sheets

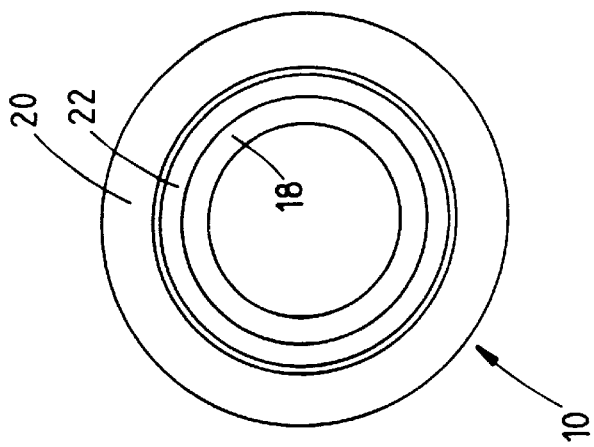
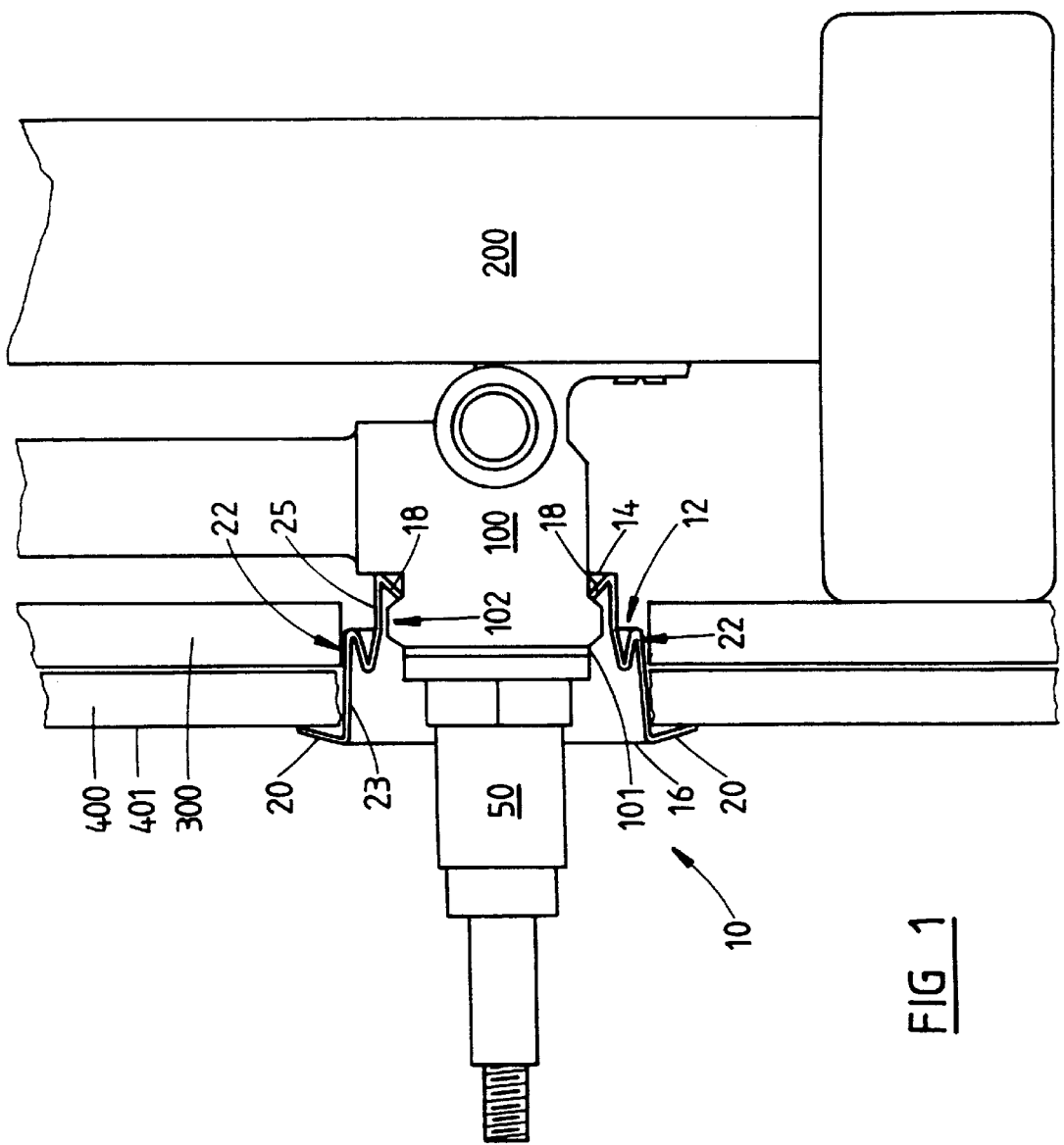

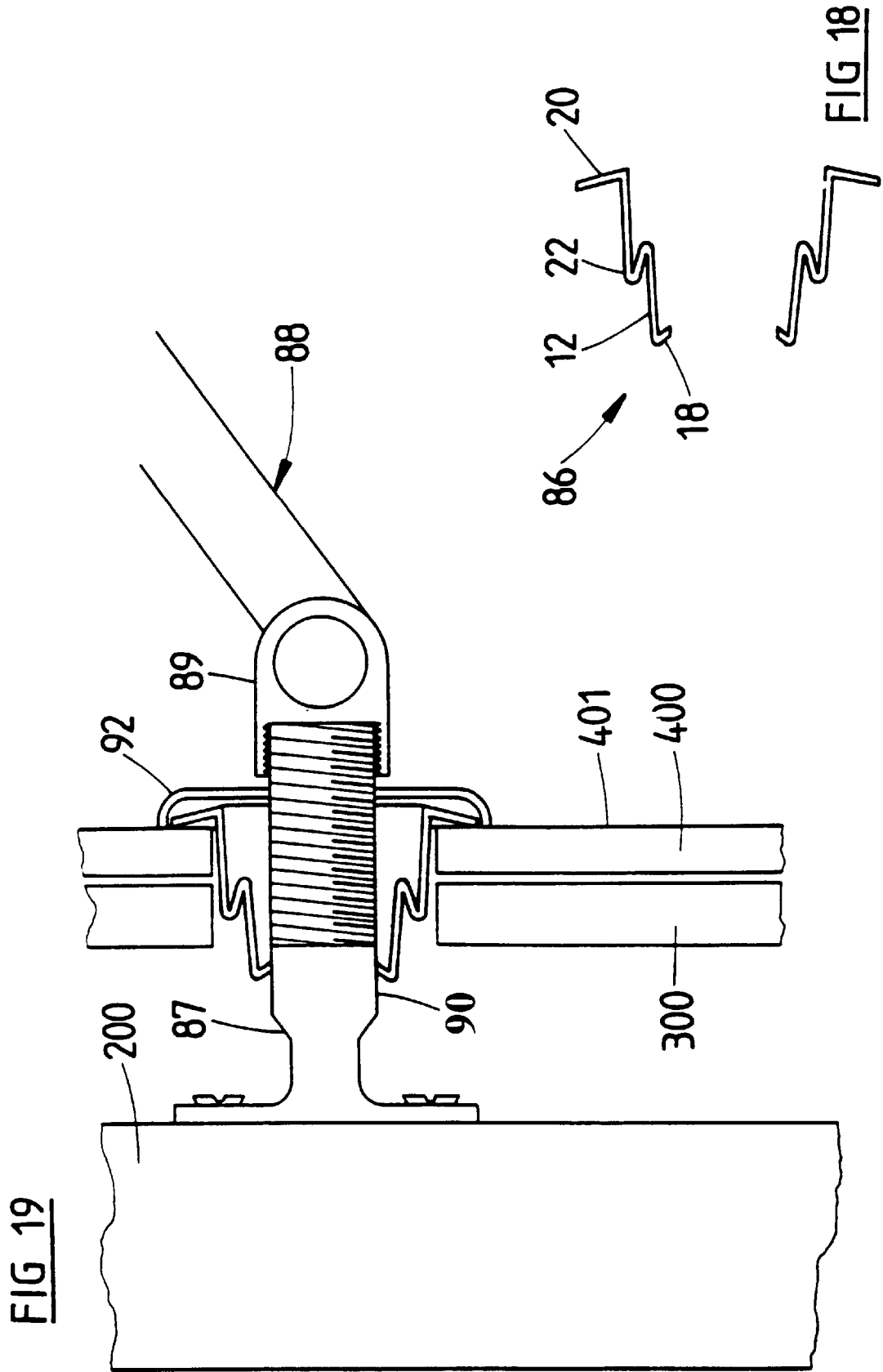

WATER DIVERTING DEVICE

This invention relates to a diverting device for diverting water which has leaked from a plumbing fitting away from areas which would be sensitive to water damage.

If the seal between a tap body and tap breech is poor a slow weep of water from between the connection can occur. This weep of water normally goes unnoticed and builds up behind the wall or surface on which the tap is mounted. Over a period of time, this water can cause damage to the frame and wall surfaces of the building. In wet areas, such as bathrooms, this can result in the tiles breaking away from the wall and, in extreme circumstances, dampness can cause the floor to rot and the shower-basin or other heavy fixture to fall through the floor. The costs involved in repairing such damage is quite high.

As it is almost impossible to know whether there is a water leakage between the tap body and tap breech without removing the tap cover flange, most people do not become aware that there is a leakage of water until significant damage has already occurred. It would therefore be particularly advantageous if a mechanism could be proposed to provide an early indication of any leakage. A similar problem can occur with other plumbing fittings which are mounted beneath a wall. For instance a lugged elbow or centre outlet for a shower is usually mounted behind a wall and if the fitting leaks water damage can occur behind the wall before there was evidence of the leak visible from outside the wall.

Some attempts have been made to solve this problem. For instance, Australian Design Registration No. 121254 discloses a water diverting device which is made of elastomeric material and has an inner part which engages a tap breach and an outer part which includes an annular channel which can engage the periphery of a hole cut or punched through the villa board for mounting of the tap. This device is, however, of limited utility because the annular groove can only receive board of a fixed thickness typically 45 mm. Further, the groove cannot accommodate any tiles which are mounted on the board and therefore water can enter any gap between the tiles and the board. Also, because the groove receives the board it is more limited in its application because sometimes the gap between the tap body and tap breech will vary in the distance set back behind the board. It is also difficult to retrofit such a device to existing plumbing fittings.

The object of the invention is to provide a water diverting device which directs leaking water from a plumbing fitting to the front face of the wall. A further object of the invention is to provide a water diverting device which can be used with taps or other fittings which are set back behind the front face of the wall by a greater range of distances.

According to the present invention there is provided a water diverting device for directing leaking water from a plumbing fitting mounted behind a wall to the front face of the wall, said water diverting device comprising sleeve means, an inner flange located at an inner end of the sleeve means, an outer flange located at an outer end of the sleeve means, the arrangement being such that the inner flange engages the fitting, the fitting extends through the sleeve means and the outer flange engages the front face of the wall whereby water leaking from the fitting is directed by the water diverting device to the front of the wall.

Embodiments of the invention will now be described by way of example only with reference to the accompanying in which:

FIG. 1 is a fragmentary view showing a water diverting device of the invention;

FIG. 3 is an end view of the device;

FIG. 18 is a schematic cross-section through a still further embodiment of the invention; and FIG. 19 is a schematic sectional view showing the use of the device shown in FIG. 18.

Figure 2:
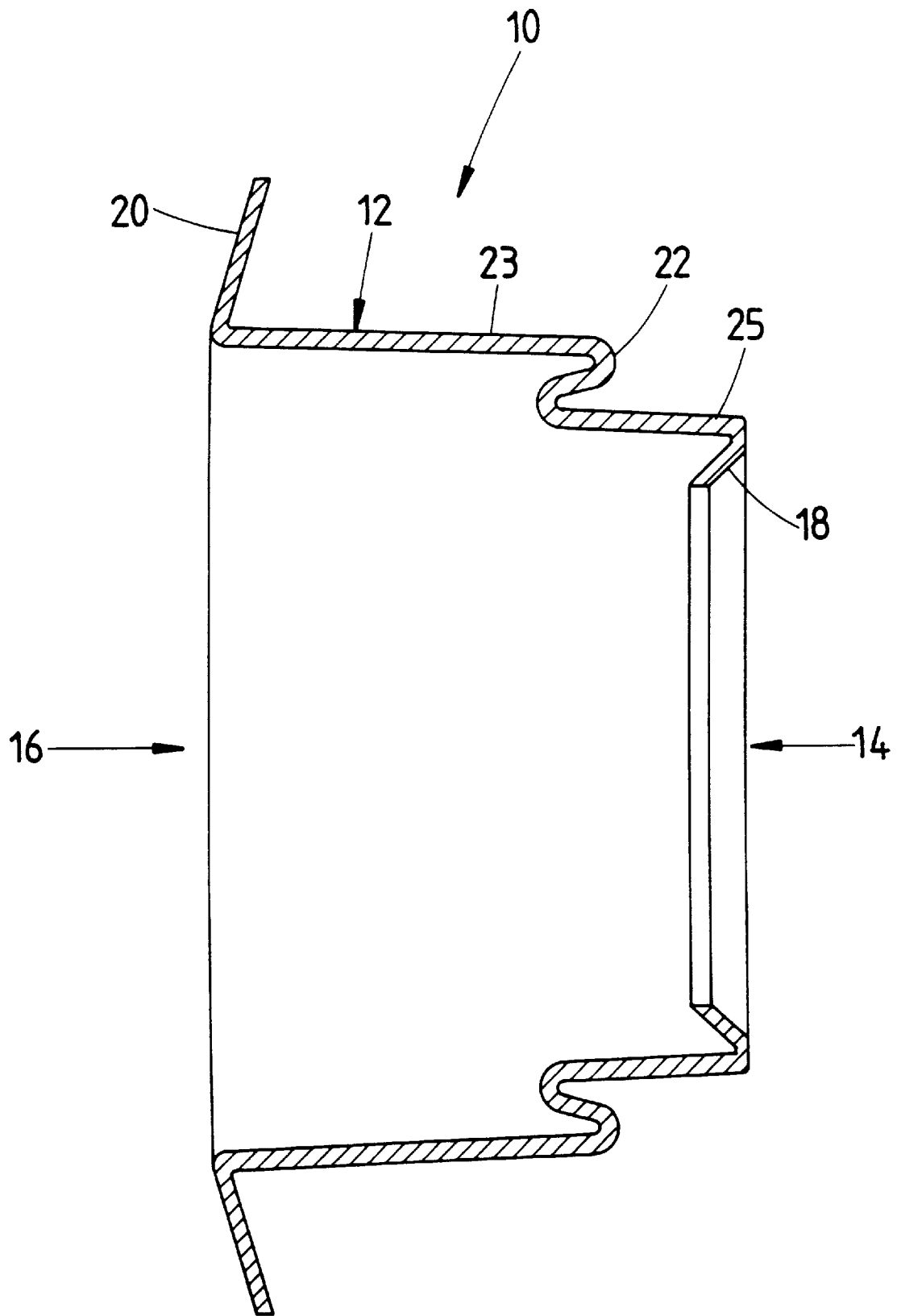
FIG. 2 is a more detailed schematic cross-sectional view through the device.

FIGS. 1 to 3 illustrate a water diverting device 10 in accordance with a first embodiment of the invention. The water diverting device 10 is coupled to a tap breech 100 which is mounted on a timber wall stud 200. A wall surface formed from plasterboard or villa board sheets 300 and rows of tiles 400 are fixed relative to the stud 200 in the conventional manner.

The water diverting device 10 comprises a sleeve 12 having an inner end 14 and an outer end 16. The sleeve 12 is arranged to extend about the connection between a tap body 50 and a tap breech 100. Usually a washer 101 is located between the body 50 and the tap breech 100.

The inner end 14 of the sleeve 12 is formed with an internal angled flange 18. The flange 18 is flexible and is angled so that the inner end 14 of the sleeve 12 can be pressed over the tap body 100, until the inner edge of the flange 18 engages and is resiliently deflected by a raised portion 102 of the tap breech 100. After passing over the raised portion 102, the sleeve 12 is prevented from being removed from the tap breech 100.

In the preferred embodiment of the invention, the water diverting device 10 is injection moulded from plastics material which, whilst having a degree of flexibility, is nevertheless stiff enough to enable the water diverting device to be pressed inwardly so that the inner edge of the flange 18 can pass readily over the raised portion 102 of the breech 100. It has been found that for the sleeve 12 and pleat 22 polyethylene having a wall thickness in the range 0.9 mm to 5 mm and preferably about 1 mm is suitable. Preferably further the outer flange 20 has a wall thickness of 0.6 mm and the inner flange 18 has a wall thickness of 0.7 mm. More particularly, the preferred material is alkathene polythene CBL 78 supplied by ICI Plastics, is suitable. This material complies with ISO 8779.

Extending from the outer end 16 of the sleeve 12 is an external flange 20. Flange 20 is angled toward the inner end 14 and is arranged, in situ, to abut against the surface 401 of the wall which, in the illustrated arrangement, is the front face of the tiles 400. Typically, the external flange 20 would extend at about 75° from the horizontal. In this manner, water flowing down the surface 401 is prevented from flowing between the underside of the flange 20 and the surface of the tiles 400.

As the thickness of the tiles 400 and the sheets 300 may vary, and in order to allow for possible variations in the location of the tap breech 100 relative to the surface of the tile 400, the sleeve 12 includes an adjustment means. As shown in FIG. 1, the adjustment means comprises a pleat 22 in the sleeve 12 thereby dividing the sleeve into a forward portion 23 and a rear portion 25. The pleat 22 in cross-section forms a "Z" shape. The pleat 22 is formed such that the horizontal distance or spacing between the inner and outer ends 14, 16 of the sleeve can be varied by moving the outer end 16 relative to the inner end 14 and thereby deforming the pleat 22. Thus, by pulling the outer end 16 away from the inner end 14 the pleat 22 can be straightened so as to increase the distance between the ends 14 and 16. To decrease the distance between the ends 14, 16, the outer end 16 is pushed towards the inner end 14, which causes deformation in the area of the pleat 22. A slight vertical adjustment of the position of the outer end 16 relative to the inner end 14 may also be made in a similar manner.

The water diverting device 10 is arranged such that any fluid leakage from the connection between the tap body 50 and the top breech 100 will flow onto the side wall of the sleeve 12 and will thereafter flow towards the outer end 16 of the sleeve 12. The water will then flow along the flange 20 and onto the surface of the tile 400. Thus, it will be appreciated, that water is prevented from flowing between the tiles 400 and the sheet 300 and between the sheet 300 and the studs 200 of the building or house. Fluid leaking from the connection between the tap body 50 and tap bridge 100 cannot therefore cause any structural damage to the building and will be easily noticed by any one using the tap. Consequently, the washer 101 between the tap body 50 and tap breech 100 can be promptly replaced.

To facilitate the flow of fluid towards the outer end 16 of the sleeve 12, the sleeve 12 is preferably arranged such that the diameter of the inner end 14 is smaller than the diameter of the outer end 16. As shown in FIG. 1, the slope of the rear portion 25 of the sleeve 12 between the inner end 14 and the pleat 22 is preferably inclined from the axial by about 2°. The front portion 23 of the sleeve 12 between the pleat 22 and the outer end 16 is also inclined by a similar angle.

The flange 18 is preferably angled at 45° to the horizontal. Such an angle facilitates the engagement of the flange 18 against the raised portion 102 of the tap breech 100. Furthermore, because of the flexible nature of the angled flange 18, the flange 18 provides a further mechanism by which a slight adjustment of the distance between the ends 14 and 16 can be achieved.

Figure 4:
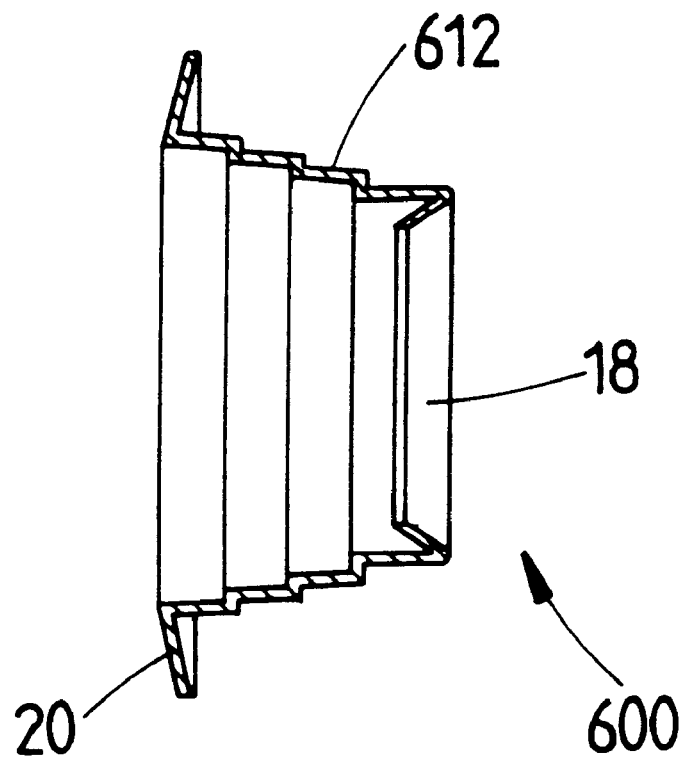
FIG. 4 shows an alternative embodiment of the device.

The water diverting device 600 shown in FIG. 4 is similar to the water diverting device 10 shown in FIG. 1 except that the configuration of the sleeve 612 is stepped rather than pleated. The stepped arrangement helps to facilitate the run-off of leaking water as well as to enable adjustment of the position of the outer end 16 of the sleeve 12 relative to the inner end 14.

Figure 5:
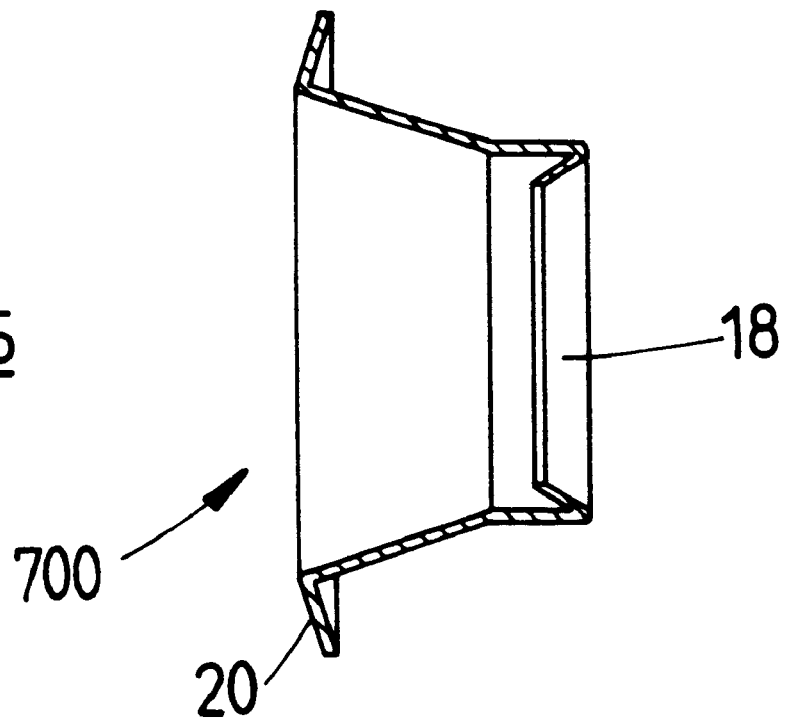
FIG. 5 shows an alternative embodiment of the device.

FIG. 5 illustrates a further embodiment of the water diverting device 700. The water diverting device 700 is substantially similar to that described in connection with FIG. 1 but includes a modified sleeve configuration.

Figure 7:
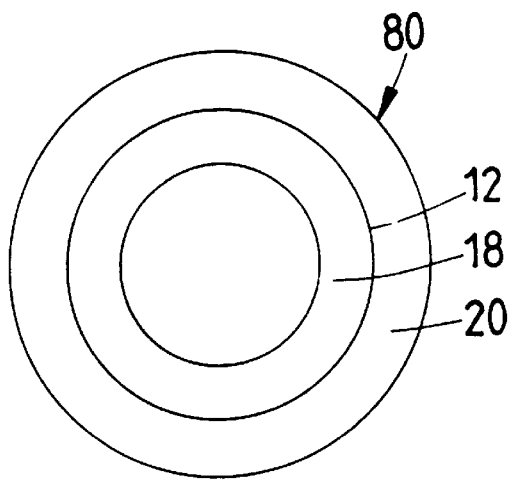
FIG. 7 is an end view of the device shown on FIG. 6.
Figure 6:
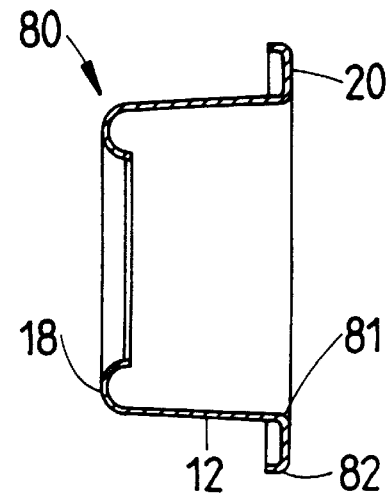
FIG. 6 is a schematic side view through an alternative form of the device.

FIGS. 6 and 7 show a further alternative device 80 of the invention. In this embodiment, the inner flange 18 is curved in cross-section so as to interlock with the partial groove formed at the rear of the raised portion 102 of the breech 100. Also in this embodiment, the outer flange 20 has rounded inner and outer peripheries 81 and 82.

Figure 9:
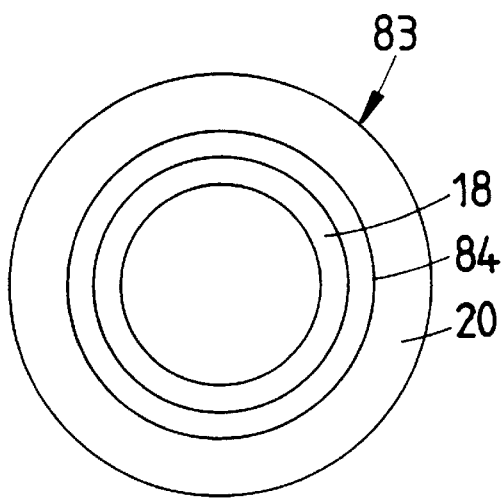
FIG. 9 is an end view of the device shown in FIG. 8.
Figure 8:
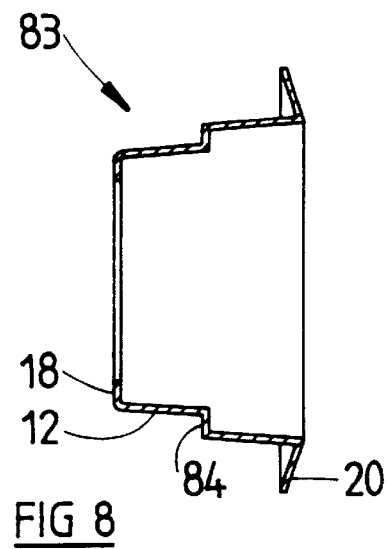
FIG. 8 is a schematic view of an alternative form of the device.

FIGS. 8 and 9 illustrate a further device 83 of the device. This device is similar to that shown in FIG. 4 except that the sleeve 12 includes a single step 84. Also the inner flange 18 is transverse to the central axis and not swept towards the front flange 20.

Figure 11:
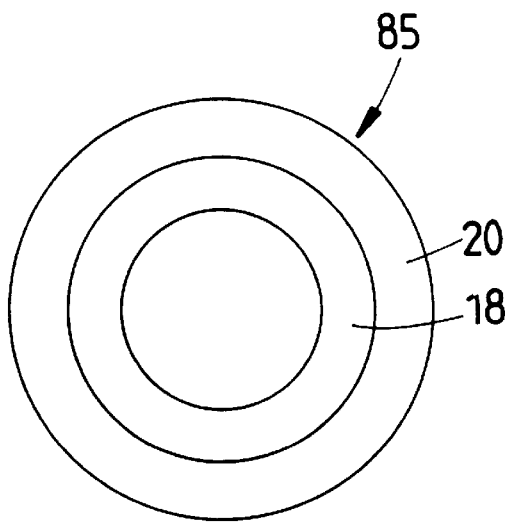
FIG. 11 is an end view of the device shown in FIG. 10.
Figure 10:
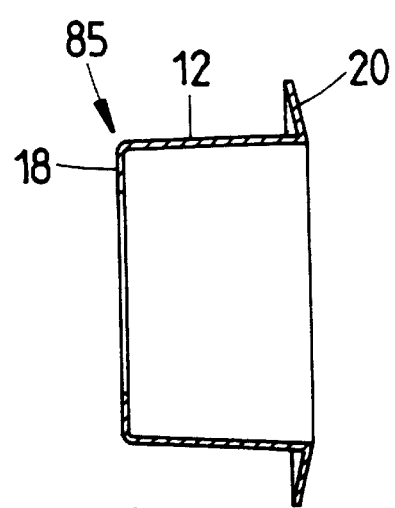
FIG. 10 is a schematic cross-sectional view through an alternative form of the device.

FIGS. 10 and 11 illustrate a further device 85 of the invention. In this embodiment the sleeve 12 is not stepped nor does it include a pleat. The inner flange 18 is not swept back as in the embodiment of FIGS. 1 to 3.

In most tap breeches, the diameter is about 28.5 mm and the width of the diameter of the raised portion 102 is generally about 30.66 mm. To accommodate tap breeches of this size, it is preferred that the inner diameter of the flange 18 is 28 mm and the inner and outer diameters of the flange 18 are about 42.5 mm and 60 mm respectively.

Preferably the length of the sleeve 12 of the water diverting device is about 28 mm. Where the water diverting device 10 is to be used in a solid brick wall it may be desirable to make the overall length shorter. In this case an overall length of say 20 mm would normally be suitable.

In order to improve the operation of the water diverting device of the invention, it may be desirable to place a sealant material on the underside of the flange 20 so that it forms a seal with the front surface 401 of the tiles 400. A bead of silicon sealant would be suitable for this purpose.

Figure 12:
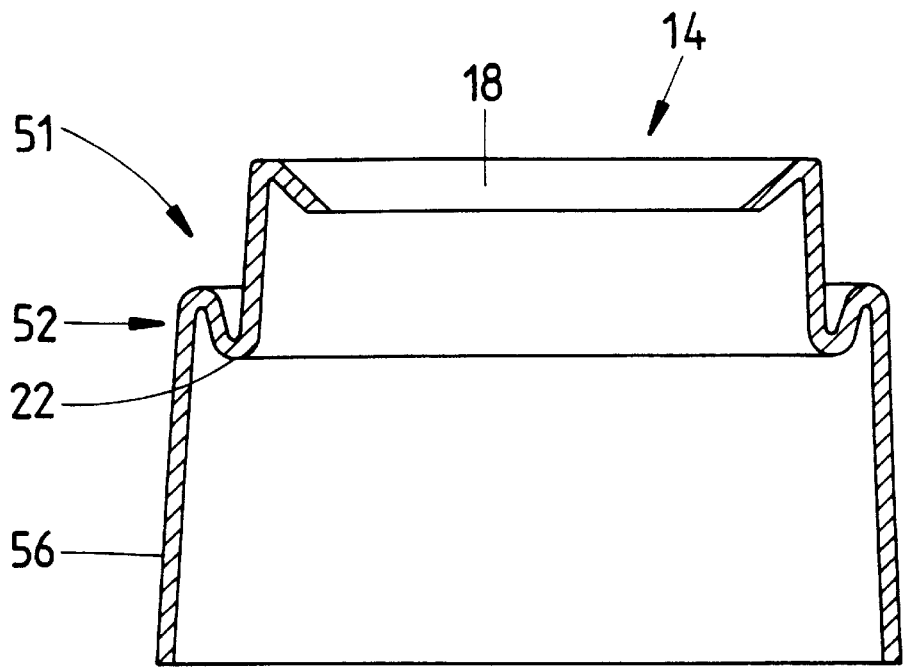
FIGS. 12 and 13 are enlarged cross-sectional views through a further embodiment of the invention constructed in two parts.
Figure 13:
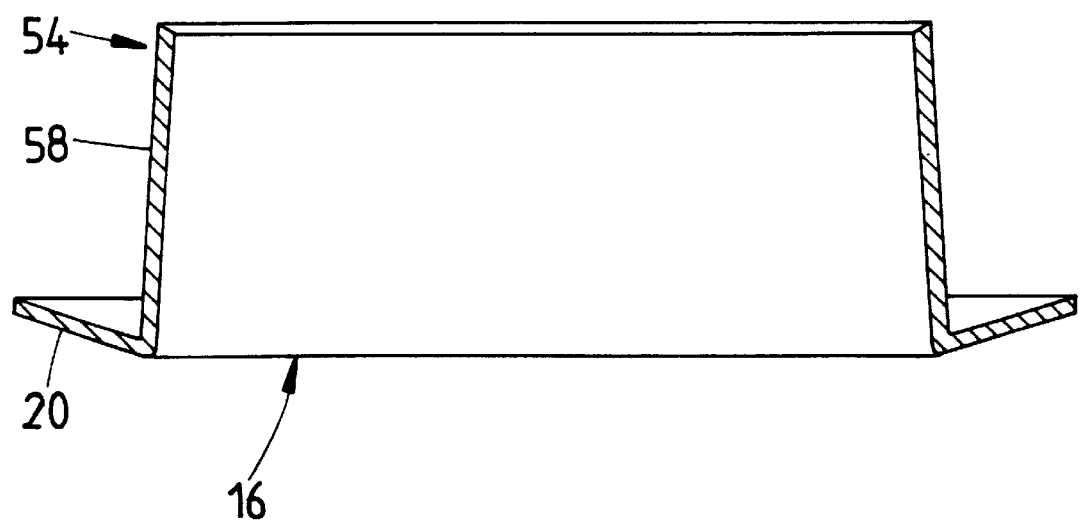

FIGS. 12 and 13 illustrate a further embodiment of a water diverting device 51 which is constructed of two separate parts 52 and 54. The arrangement is similar to that shown in FIGS. 1 to 3 and the same reference numerals have been used to denote parts which correspond. In this embodiment, the sleeve 12 can be regarded as being formed in two separate parts which are telescopically coupled together. In particular, the part 52 has a tubular portion 56 which can be telescopically inserted in a tubular portion 58 of the other part 54. This enables a more effective adjustment of the overall axial length of the water diverting device 51. The tubular portion 56 is snugly received within the tubular portion 58 so as to form a generally watertight connection therewith. It will be appreciated, of course, that any water leaking from the junction between the tap body 50 and breech 102 will not be under pressure and therefore this form of interconnection is thought to be suitable for most applications. The materials and dimensions of the water diverting device 51 can be the same (where relevant) of the embodiment of FIGS. 1 to 3. It is preferred that the axial length of the part 52 is about 25 mm long whereas the axial length of the part 54 is about 20 mm long. The inner diameter of the flange 20 is 42.4 mm and the outer diameter of the flange 20 is preferably 60 mm.

Figure 14:
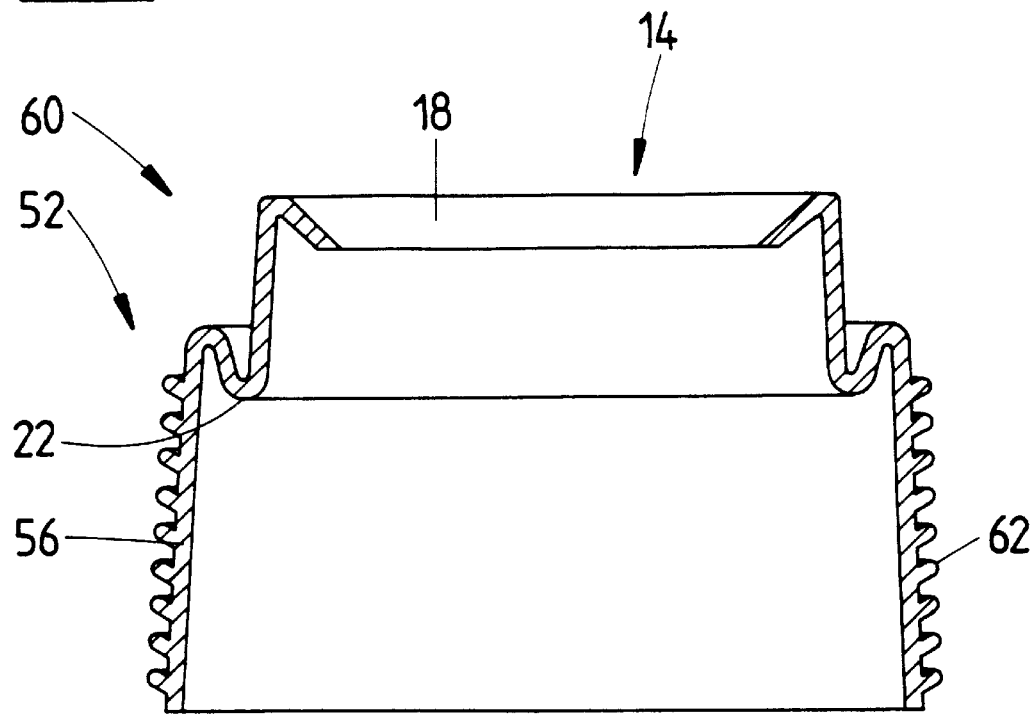
FIGS. 14 and 15 are enlarged cross-sectional views through a further embodiment of the invention.
Figure 15:
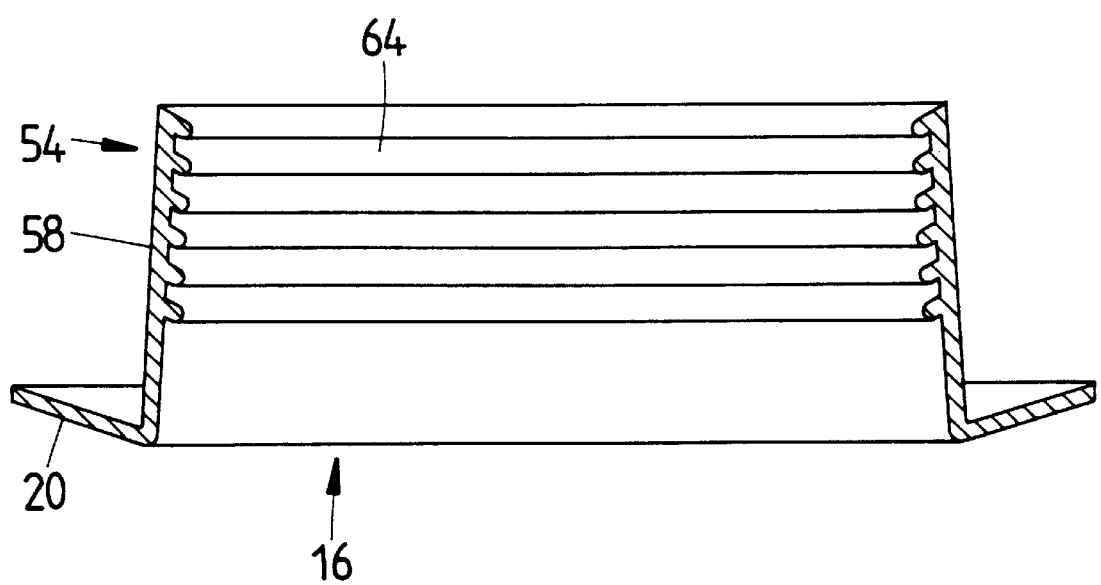

FIGS. 14 and 15 illustrate a further embodiment of the invention. Again in this embodiment, a water diverting device 60 is formed in two parts which are generally similar to those formed in FIGS. 12 and 13 except that the outer diameter of the tubular portion 56 is formed with a plurality of projecting ribs 62. The inner bore of the part 54 is provided with a plurality of ribs 64 which are generally complementary to the rib 62 of the other part. When the two parts 52 and 54 are coupled together, the ribs 62 and 64 interlock so as to form a firmer interconnection of the two parts 52 and 54. To assist in this interlocking, the ribs 62 are swept rearwardly, that is to say towards the first end 14, whereas the rib 64 of the other part are swept towards the second end 16.

Figure 16:
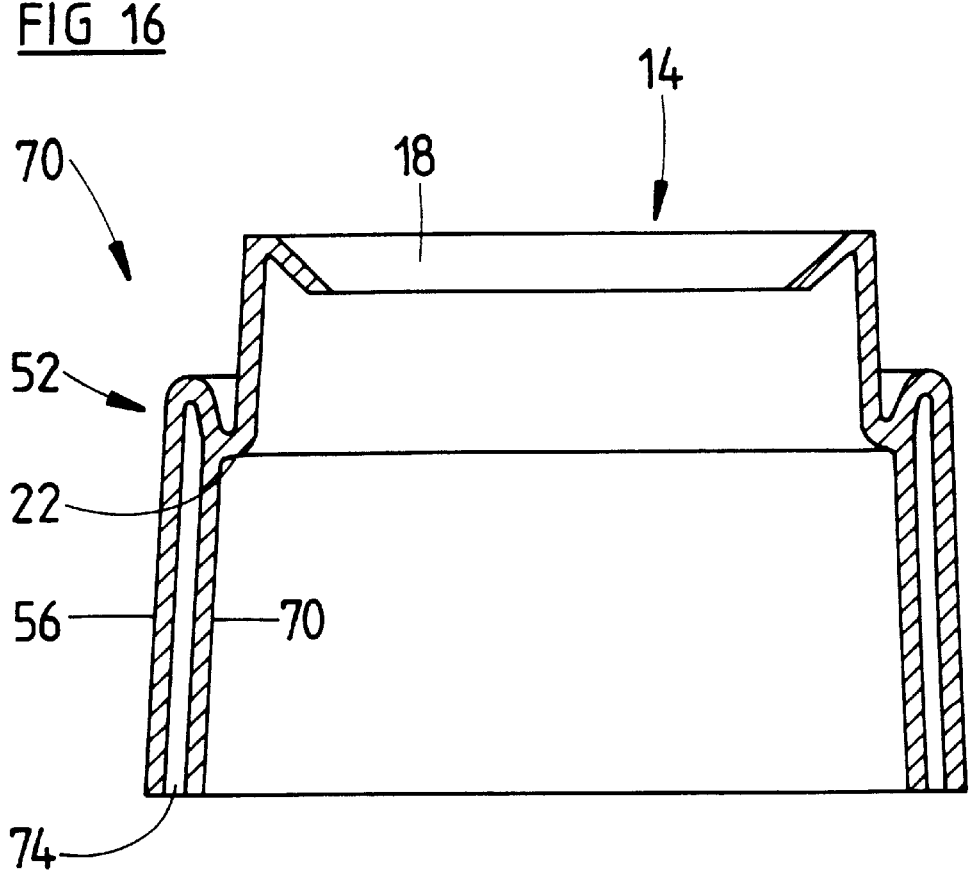
FIGS. 16 and 17 are further enlarged views of an alternative embodiment of the invention.
Figure 17:
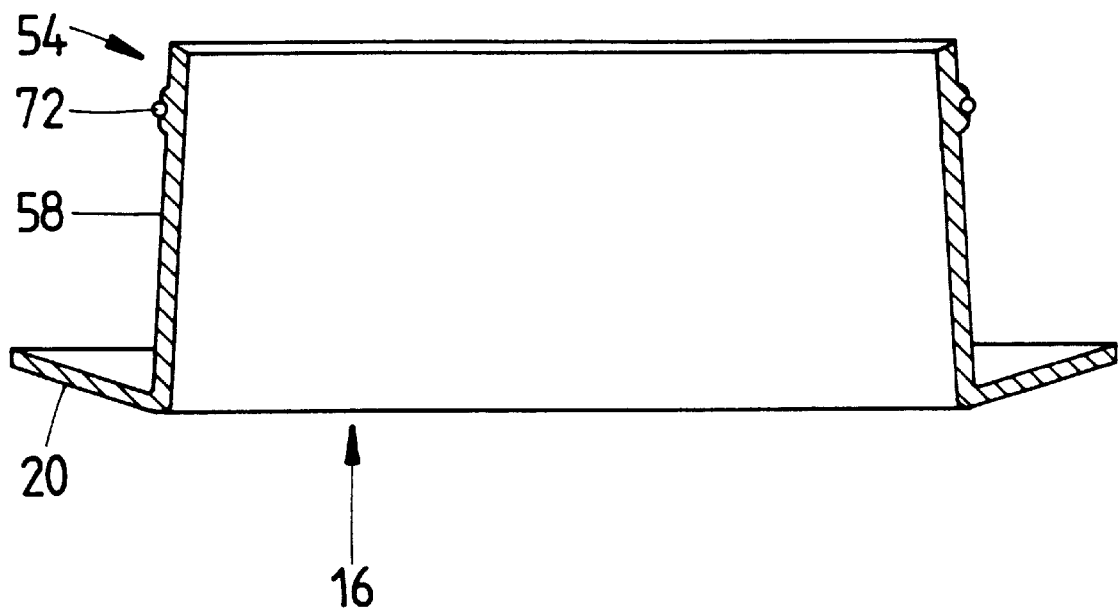

FIGS. 16 and 17 illustrate a further water diverting device 70 of the invention. The water diverting device is again constructed in two parts which are generally similar to those shown in FIGS. 5 and 6. The part 52 includes an inner wall 70 which is generally parallel to the sleeve portion 56 and defines therebetween a recess 74. The recess is arranged to receive the sleeve portion 58 of the part 54. Sealing between the two parts 52 and 54 can be enhanced by provision of an O-ring 72. In the illustrated arrangement, the O-ring 72 is seated in a shallow groove formed on an annular projection on the sleeve portion 58. It will be appreciated, however, that the O-ring 72 could be located on the inner face of the sleeve portion 56.

All of the devices shown in the drawings are suitable for use with taps mounted in plaster, villa board, solid brick and/or concrete walls.

Embodiments of the invention are particularly advantageous because they provide a simple mechanism for preventing fluid leaking from the connection between the tap body and the tap breech from causing structural or cosmetic damage to a building or wall surface. The leaking fluid is directed onto the surface of the tile wall and will thus be readily detected and prompt repair of the connection between the tap body and tap breech made. It is envisaged that a water diverting device in accordance with an embodiment of the present invention would be made of a plastics material and would therefore be of a relatively low cost. Embodiments of the water diverting device would also be easy to install.

Embodiments of the invention will have wide application. Embodiments of the water diverting device can be used for example with shower taps, bath taps, kitchen taps etc.

FIG. 18 is a diagrammatic representation of a device 86 which is particularly suited for use with plumbing fittings other than taps. For instance the device 86 can be used with lug elbows, centre outlets or the like. In this drawing the same reference numerals have been used to denote parts which correspond to those of the other embodiments. It will be seen that the sleeve 12 is tapered and includes a pleat 22. The inner flange 18 is swept inwardly as in the case of the embodiments of FIGS. 1 to 3. The outer flange 20 is swept inwardly as in other embodiments.

FIG. 19 diagrammatically illustrates the use of the device shown in FIG. 18 on a lugged elbow 87 for a shower arm 88. The shower arm includes a threaded socket 89 which is threaded onto the threads of the lug 87. If there is a leak at the junction of the socket 89 and the lug 87 water would be prone to flow rearwardly along the lug and fall on the rear face of the sheet 300 or into the gap between the sheet 300 and the frame 200. The device 86 of the invention prevents this occurring. It will be seen that the inner flange 18 engages the unthreaded portion 90 of the lug 87. This forms an effective watertight coupling thereto. Any water which leaks from the junction of the socket 89 and lug 87 will therefore be collected within the interior of the sleeve 12 and be directed forwardly so as to fall over the outer flange 20 and onto the outer surface 401 of the tiles 400. The shower arm 88 includes a cover plate 92 which conceals the flange 20 and other parts of the device 86. Preferably the dimensions of the device 86 are approximately as follows:

| | |
|---|---|
| outer diameter of flange 20 | 55 mm |
| inner diameter of flange 20 | 35 mm |
| inner diameter of flange 18 | 19 mm |
| outer diameter of flange 18 | 24 mm |
| overall length | 28 mm |

The same materials and thicknesses can be used as in the previous embodiments.

It will be appreciated by those skilled in the art that the devices of the invention can be retrofitted to existing taps, washing machine cocks, lugged elbows and outlets and the like simply by removing the cover plate which is normally provided, pressing the diverting device of the invention into place on the fitting mounted behind the wall. A silicon sealant can be used on the rear face of the outer flange 20 in order to seal against the outer face 401, the cover plate can then be replaced in the usual way to conceal the device of the invention. Where the device is used with taps, it will be appreciated that the body washer 101 can be replaced without the need to remove the device from its position.

Embodiments of the invention have been described by way of example only and modifications are possible within the scope of the invention.

I claim:

1. A water diverting device for directing leaking water from the junction of first and second plumbing fittings mounted behind a wall to the front face of the wall, said device comprising:

sleeve means;

an inner flange located at an inner end of the sleeve means; and an outer flange located at an outer end of the sleeve means;

the arrangement being such that the inner flange engages in use the first plumbing fitting and the junction of the first and second fittings is located, in use, within said sleeve means and between the inner and outer ends thereof and the outer flange overlies the front face of the wall whereby water leaking from the junction is directed by the sleeve means to the front face of the wall.

2. A device as in claim 1 wherein the first plumbing fitting comprises a tap breech which is engaged by an inner periphery of the inner flange wherein the second fitting comprises a tap body which passes through the sleeve means.

3. A device as in claim 1 wherein the first plumbing fitting comprises a lugged outlet or a center outlet which is engaged by an inner periphery of the inner flange.

4. A device as in claim 1 wherein the device is molded from one or more plastics materials.

5. A device as in claim 4 wherein the plastics material comprises polyethylene.

6. A device as in claim 4 including adjustments means for adjusting the effective distance between said inner and outer ends.

7. A device as in claim 6 wherein the adjustment means comprises at least one pleat which can be deformed to adjust the effective distance between said inner and outer ends.

8. A device as in claim 7 wherein the sleeve portion tapers slightly from its outer end towards its inner end.

9. A device as in claim 8 wherein the outer flange is generally frustoconical in shape and its outer edge is swept back towards the inner end of the flange.

10. A device as in claim 9 wherein the inner flange is generally frustoconical in shape and its inner edge is swept forward towards the outer end of the flange.

11. A device as in any one of claims 4 to 10 wherein the device comprises an integral body.

12. A device as in claim 11 wherein the wall thickness of the sleeve means is about 1 mm.

13. A device as in claim 11 wherein the inner edge of the outer flange is about 42 mm in diameter.

14. A device as in claim 13 wherein the outer edge of the outer flange is about 60 mm in diameter.

15. A device as in any one of claims 4 to 10 wherein the device is molded as an inner portion and an outer portion.

16. A device as in claim 15 wherein the sleeve formed with the inner portion and an outer sleeve formed with the outer portion and wherein the inner sleeve is telescopically mountable in the outer sleeve to thereby adjust the effective distance between said inner and outer ends.

17. A device as in claim 16 wherein said inner sleeve and outer sleeve are provided with interlocking ribs.

18. A device as in claim 16 wherein the inner sleeve includes an inner sidewall portion which defines a recess in which the outer sleeve is receivable.

19. A device as in claim 18 wherein the outer sleeve is provided with an O-ring to sealingly engage said recess.

20. A device as in claim 15 wherein the wall thicknesses of the inner and outer sleeves is thinner than the wall thickness of the sleeve means.

21. A device as in claim 12 wherein the wall thickness of the sleeve means is about 1 mm.

22. A device as in claim 12 wherein the inner edge of the outer flange is about 42 mm in diameter.

23. A device as in claim 22 wherein the outer edge of the outer flange is about 60 mm in diameter.

24. A water-diverting device for directing leaking water from the junction of first and second plumbing fittings mounted behind a wall to the front face of the wall, said device including:
sleeve means having a hollow tapered body, and outer and inner flanges;
the outer flange being integral with the sleeve means at the outer end and directed generally outwardly relative to the body;
the inner flange being integral with the sleeve means at the inner end and directed generally inwardly relative to the body; and
the hollow tapered body being tapered from the outer flange to the inner flange, wherein the tapered body enables the device to be inserted, in use, in an opening in the wall so that the inner flange sealingly engages the innermost plumbing fitting and the outer flange overlies the front face of the wall adjacent to the opening, the arrangement being such that the junction of the plumbing fittings is located, in use, between the inner flange and the outer flange and inside the tapered body such that any water leaking from the junction is diverted by the sleeve means to the front face of the wall.

25. A device as claimed in claim 24 wherein the outer flange lies on a conical surface, the apex of which is exterior of said body and the inner flange lies on a conical surface, the apex of which is within said body.

26. A device as in claim 25 wherein the body is stepped and has a larger diameter portion contiguous with the outer flange and a smaller diameter portion contiguous with the inner flange.

27. A device as in claim 26 further including a pleat which is Z-shaped in cross-section.

28. A device as claimed in claim 27 wherein only a single outer flange extends outwardly from said body.

29. A plumbing installation including:
first and second plumbing fittings mounted behind a wall, wherein the first fitting is that closest to the front face of the wall and the second fitting is that farthest behind the wall, the first and second fittings having a junction therebetween;
an opening in the wall; and
a water-diverting device as claimed in claim 24 mounted in the opening with the outer flange overlying the wall adjacent to the opening and the inner flange engaging the second fitting and the junction being located within the tapered body.

30. A method of diverting potential leaked water away from plumbing fittings, whereby a water-diverting device as claimed in claim 24 is inserted into a plumbing installation as claimed in claim 29, including:
placing the inner flange end of said water-diverting device around the end of the first plumbing fitting and pushing said device over the plumbing fittings and into the opening until the inner flange of said water-diverting device sealingly engages the second plumbing fitting behind the junction of the fittings and the outer flange overlies the front face of the wall.

31. A water-diverting device for directing leaking water from the junction of first and second plumbing fittings mounted behind a wall to the front face of the wall, said water-diverting device including:
sleeve means having:
a hollow body portion;
an outer flange, integral with the body portion at the outer end and swept back in the direction of the inner end such that the outer flange forms an acute angle with the body portion;
an inner flange, integral with the body portion at the inner end and swept back in the direction of the outer end such that the inner flange forms an acute angle with the body portion; and
said water-diverting device to be inserted, in use, in an opening in the wall so that the inner flange sealingly engages the innermost plumbing fitting and the outer flange overlies the front face of the wall adjacent to the opening, the arrangement being such that the junction of the plumbing fittings is located, in use, between the inner flange and the outer flange and inside the body portion such that any water leaking from the junction would be diverted by the sleeve means to the front face of the wall.

32. A device as in claim 31 wherein the outer flange lies on a conical surface, the apex of which is exterior of said body and the inner flange lies on a conical surface, the apex of which is within said body.

33. A device as in claim 32 wherein the body is stepped and has a larger diameter portion contiguous with the outer flange and a smaller diameter portion contiguous with the inner flange.

34. A device as in claim 33 further including a pleat which is Z-shaped in cross-section.

35. A device as claimed in claim 34 wherein only a single outer flange extends outwardly from said body.

36. A plumbing installation including:
first and second plumbing fittings mounted behind a wall, wherein the first fitting is that closest to the front face of the wall and the second fitting is that farthest behind the wall and the first and second fittings having a junction therebetween;
an opening in the wall; and
a water-diverting device as claimed in claim 31 mounted in the opening with the outer flange overlying the wall adjacent to the opening and the inner flange engaging the second fitting and the junction being located within the body portion.

37. A method of diverting potential leaked water away from plumbing fittings, whereby a water-diverting device as claimed in claim 31 is inserted into a plumbing installation as claimed in claim 36, including:
placing the inner flange end of said water-diverting device around the end of the first plumbing fitting and pushing said water-diverting device over the plumbing fittings and into the opening until the inner flange of said water-diverting device sealingly engages the second plumbing fitting behind the junction of the fittings and the outer flange overlies the front face of the wall.

38. A water-diverting device for directing leaking water from the junction of first and second plumbing fittings mounted behind a wall to the front face of the wall, said device including:

sleeve means having:
   a hollow body portion;
   an outer flange, integral with the sleeve means at the outer end and directed generally outwardly;
   an inner flange, integral with the sleeve means at the inner end and directed generally inwardly;
   said sleeve means being formed with one or more deflectable portions which permit variation of the spacing between the flanges;
whereby the sleeve means can be inserted, in use, in an opening in the wall so that the inner flange sealingly engages the innermost plumbing fitting and the outer flange overlies the front face of the wall adjacent to the opening;
the arrangement being such that the junction of the plumbing fittings is located, in use, between the inner flange and the outer flange and inside the body portion such that any water leaking from the join would be diverted by the sleeve means to the front face of the wall.

39. A device as in claim 38 wherein the outer flange lies on a conical surface, the apex of which is exterior of said body and the inner flange lies on a conical surface, the apex of which is within said body.

40. A device as in claim 39 wherein the body is stepped and has a larger diameter portion contiguous with the outer flange and a smaller diameter portion contiguous with the inner flange.

41. A device as claimed in claim 40 further including a pleat which is Z-shaped in cross-section.

42. A device as in claim 41 wherein only a single outer flange extends outwardly from said body.

43. A plumbing installation including:
   first and second plumbing fittings mounted behind a wall, wherein the first fitting is that closest to the front face of the wall and the second fitting is that farthest behind the wall and the first and second fittings having a junction therebetween;
   an opening in the wall; and
   a water-diverting device as claimed in claim 38 mounted in the opening with the outer flange overlying the wall adjacent to the opening and the inner flange engaging the second fitting and the junction being located within the body portion and whereby the one or more deflectable portions of the sleeve means allow for changes in the distance and orientation of the inner flange with respect to the outer flange.

44. A method of diverting potential leaked water away from plumbing fittings, whereby a water-diverting device as claimed in claim 38 is inserted into a plumbing installation as claimed in claim 43, including:
   placing the inner flange end of said water-diverting device around the end of the first plumbing fitting and pushing said water-diverting device over the plumbing fittings and into the opening until the inner flange of said water-diverting device sealingly engages the second plumbing fitting behind the junction of the fittings and the outer flange overlies the front face of the wall and such that the one or more deflectable portions of the sleeve means allow for changes in the distance and orientation of the inner flange with respect to the outer flange.

45. A water-diverting device for directing leaking water from the junction of first and second plumbing fittings mounted behind a wall to the front face of the wall, said device including:

sleeve means having:
   a hollow body portion;
   an outer flange, integral with the sleeve means at the outer end and directed generally outwardly;
   an inner flange, integral with the sleeve means at the inner end and directed generally inwardly;
   said outer flange being the only outward flange located on the sleeve means, whereby the sleeve means can be inserted, in use, in an opening in the wall so that the inner flange sealingly engages the innermost plumbing fitting and the outer flange overlies the front face of the wall adjacent to the opening; and
   the arrangement being such that the junction of the plumbing fittings is located, in use, between the inner flange and the outer flange and inside the body portion such that any water leaking from the junction would be diverted by the sleeve means to the front face of the wall.

46. A device as in claim 45 wherein the outer flange lies on a conical surface, the apex of which is exterior of said body and the inner flange lies on a conical surface, the apex of which is within said body.

47. A device as in claim 46 wherein the body is stepped and has a larger diameter portion contiguous with the outer flange and a smaller diameter portion contiguous with the inner flange.

48. A device as in claim 47 further including a pleat which is Z-shaped in cross-section.

49. A device as in claim 48 wherein only a single outer flange extends outwardly from said body.

50. A plumbing installation including:
   first and second plumbing fittings mounted behind a wall, where the first fitting is that closest to the front face of the wall and the second fitting is that farthest behind the wall and the first and second fittings having a junction therebetween;
   an opening in the wall; and
   a water-diverting device as claimed in claim 45 mounted in the opening, and insertable therein without hindrance from any protrusion from the body portion, with the outer flange overlying the wall adjacent to the opening and the inner flange engaging the second fitting and the junction being located within the body portion.

51. A method of diverting potential leaked water away from plumbing fittings, whereby a water-diverting device as claimed in claim 45 is inserted into a plumbing installation as claimed in claim 50, including:
   placing the inner flange end of said water-diverting device around the end of the first plumbing fitting and pushing said water-diverting device over the plumbing fittings and into the opening, without hindrance from any protrusion from the body portion, until the inner flange of said water-diverting device sealingly engages the second plumbing fitting behind the junction of the fittings and the outer flange overlies the front face of the wall.

52. A method as claimed in any one of claims 30, 37, 44 or 51 wherein the outer flange lies in a plane parallel to the outer face of the wall.

* * * * *